United States Patent
Marumoto

(10) Patent No.: US 7,985,480 B2
(45) Date of Patent: Jul. 26, 2011

(54) INTERLAYER FILM FOR GLASS LAMINATE AND GLASS LAMINATE

(75) Inventor: Tadashi Marumoto, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 1040 days.

(21) Appl. No.: 11/795,642

(22) PCT Filed: Apr. 23, 2007

(86) PCT No.: PCT/JP2007/058742
§ 371 (c)(1),
(2), (4) Date: Jul. 19, 2007

(87) PCT Pub. No.: WO2007/125868
PCT Pub. Date: Nov. 8, 2007

(65) Prior Publication Data
US 2009/0305058 A1    Dec. 10, 2009

(30) Foreign Application Priority Data

Apr. 25, 2006    (JP) .................................. 2006-120685

(51) Int. Cl.
*B32B 17/10*    (2006.01)
*C08K 5/101*    (2006.01)

(52) U.S. Cl. ..................... 428/436; 428/437; 428/524

(58) Field of Classification Search .................. 428/436, 428/437, 524
See application file for complete search history.

(56) References Cited

U.S. PATENT DOCUMENTS
4,563,296 A * 1/1986 Gomez ............................. 252/1

FOREIGN PATENT DOCUMENTS
| | | |
|---|---|---|
| JP | 60-60149 | 4/1985 |
| JP | 10-338521 | 12/1998 |
| JP | 2000-281934 | 10/2000 |
| JP | 2001-233643 | 8/2001 |
| JP | 2005-281074 | 10/2005 |
| WO | WO 01/19747 A1 | 3/2001 |
| WO | WO 01/42158 A1 | 6/2001 |
| WO | WO-2006/025484 A1 | 3/2006 |

OTHER PUBLICATIONS
International Search Report, Jun. 12, 2007.

* cited by examiner

*Primary Examiner* — D. S Nakarani
(74) *Attorney, Agent, or Firm* — Cheng Law Group, PLLC

(57) ABSTRACT

Disclosed herein are an interlayer film for glass laminate, which contains a polyvinyl acetal resin and can be easily bonded to glass sheets to produce a glass laminate having high transparency, and a glass laminate using such an interlayer film. The interlayer film for glass laminate includes 100 parts by weight of a polyvinyl acetal resin and 40 to 75 parts by weight of a plasticizer, wherein 4 to 40 wt % of the plasticizer is composed of an unsaturated fatty acid alkyl ester having 16 to 20 carbon atoms.

5 Claims, No Drawings

INTERLAYER FILM FOR GLASS LAMINATE AND GLASS LAMINATE

TECHNICAL FIELD

The present invention relates to an interlayer film for glass laminate, which contains a polyvinyl acetal resin. More specifically, the present invention relates to an interlayer film for glass laminate, which can be easily bonded to glass sheets to produce a glass laminate having high transparency, and a glass laminate using such an interlayer film.

BACKGROUND ART

A glass laminate provides superior safety because even when it is broken by, for example, an external impact, glass fragments thereof are hardly scattered, and is therefore widely used as a window pane for automobiles, rail cars, aircraft, boats and ships, and buildings.

Examples of such a glass laminate include those obtained by interposing an interlayer film for glass laminate between at least a pair of glass sheets and integrating them into one unit. As such an interlayer film for glass laminate, a plasticized polyvinyl acetal resin film, an ethylene-vinyl acetate copolymer resin film, an ethylene-acrylic acid copolymer resin film, a polyurethane resin film, a sulfur-containing polyurethane resin film, a polyvinyl alcohol resin film, or the like is usually used.

For example, Japanese Patent Application Laid-open No. S60-60149 (hereinafter, simply referred to as "Patent Document 1") discloses, as an interlayer film for glass laminate, a polyvinyl butyral sheet plasticized with a multiester of an alcohol having 2 to 4 hydroxyl groups and a $C_{16}$ to $C_{20}$ unsaturated fatty acid having a hydroxyl group attached to the acid molecule. The polyvinyl butyral sheet disclosed in Patent Document 1 further contains, in addition to the multiester component, a monoester of a glycol and a $C_{16}$ to $C_{20}$ unsaturated fatty acid having a hydroxyl group attached to the acid molecule. It is to be noted that Patent Document 1 describes that the amount of such plasticizer blend contained in the laminate interlayer film should be in the range of 10 to 55 parts per hundred parts of PVB resin (phr).

Patent Document 1 further describes that a glass laminate using the plasticized polyvinyl butyral sheet has improved peel adhesion and penetration resistance over a wide range of temperatures.

On the other hand, WO 01/19747 (hereinafter, simply referred to as "Patent Document 2") discloses an interlayer film containing 50 to 80 wt % of PVB (acetalized polyvinyl alcohol) and 20 to 50 wt % of a softener. Further, 30 to 70 wt % of the softener contained in the interlayer film disclosed in Patent Document 2 is composed of one or more polyalkylene glycols represented by the following formulas (A1) to (A6) or derivatives thereof.

HO—(R—O)$_n$—H  (A1)

where R is an alkylene group and n>5

  (A2)

where n>2, m>3, and (n+m)<25

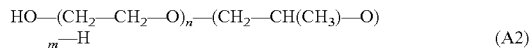  (A3) or

HO—(CH$_2$—CH$_2$—O)$_n$—(CH$_2$—CH(CH$_3$)O)$_m$—R$_1$  (A4)

where n>2, m>3, (n+m)<25, and R$_1$ is an organic group

R$_1$—O—(R$_2$—O)$_n$—H  (A5)

where R$_2$ is an alkylene group, n>2, and R$_1$ is an organic group

R$_1$—O—(R$_2$—O)$_n$—R$_3$  (A6)

where R$_2$ is an alkylene group, n>5, and R$_1$ and R$_3$ are each an organic group Patent Document 2 describes that the interlayer film contains, as a part of the softener, one or more of the above-described specific compounds in the above-described specific ratio, and therefore a glass laminate using such an interlayer film has improved sound insulation.

[Patent Document 1] Japanese Patent Laying-Open No. 1985-60149

[Patent Document 2] WO 01/19747 A1

DISCLOSURE OF THE INVENTION

In the case of producing a glass laminate, high-temperature and high-pressure autoclave treatment is usually performed to obtain a transparent glass laminate. More specifically, a glass laminate can be produced by bonding an interlayer film such as one disclosed in Patent Document 1 or 2 and glass sheets together by autoclave treatment.

As described above, such an interlayer film as disclosed in Patent Document 1 or 2 and glass sheets need to be subjected to high-temperature and high-pressure autoclave treatment to bond them together to obtain a transparent glass laminate. Such autoclave treatment is performed under severe conditions of, for example, a high-pressure of 1.5 MPa and a temperature of 140° C. for 20 minutes to pressure-bond the interlayer film and the glass sheets together, and therefore needs large and expensive equipment, which inevitably increases production cost.

In order to solve such a problem, there is a demand for development of an interlayer film which can be easily bonded to glass sheets to produce a transparent glass laminate also by non-autoclave treatment eliminating the necessity to use large and expensive equipment.

In view of such a situation of the prior art, it is an object of the present invention to provide an interlayer film for glass laminate, which contains a polyvinyl acetal resin and can be easily bonded to glass sheets to produce a glass laminate having high transparency, and a glass laminate using such an interlayer film.

In order to achieve the above object, the present invention is directed to an interlayer film for glass laminate, including: 100 parts by weight of a polyvinyl acetal resin; and 40 to 75 parts by weight of a plasticizer, wherein 4 to 40 wt % of the plasticizer is composed of an unsaturated fatty acid alkyl ester having 16 to 20 carbon atoms.

In one specific aspect of the interlayer film for glass laminate according to the present invention, the unsaturated fatty acid alkyl ester is a ricinoleic acid alkyl ester.

In another specific aspect of the interlayer film for glass laminate according to the present invention, the unsaturated fatty acid alkyl ester is an oleic acid alkyl ester.

In yet another specific aspect of the interlayer film for glass laminate according to the present invention, 60 to 96 wt % of the plasticizer is composed of a diester compound represented by the following formula (1):

[Chem. 1]

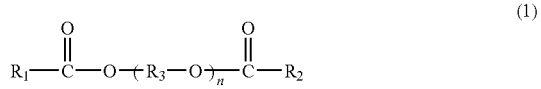

(1)

where $R_1$ and $R_2$ are each an organic group having 5 to 10 carbon atoms, $R_3$ is a group —$CH_2$—$CH_2$—, —$CH_2$—$CH(CH_3)$—, or —$CH_2$—$CH_2$—$CH_2$—, and n is an integer of 4 to 10.

The present invention is also directed to a glass laminate including: at least two transparent glass sheets; and the interlayer film for glass laminate according to the present invention sandwiched between and bonded to the glass sheets.

EFFECT OF THE INVENTION

As described above, the interlayer film for glass laminate according to the present invention includes 100 parts by weight of a polyvinyl acetal resin and 40 to 75 parts by weight of a plasticizer, and 4 to 40 wt % of the plasticizer is composed of an unsaturated fatty acid alkyl ester having 16 to 20 carbon atoms, and therefore it is not always necessary to perform autoclave treatment when a glass laminate is produced using the interlayer film for glass laminate according to the present invention. This is because the interlayer film for glass laminate according to the present invention can be easily bonded to glass sheets by non-autoclave treatment, that is, by heating a laminated structure, in which the interlayer film is sandwiched between the glass sheets, in a reduced-pressure rubber bag (i.e., by reduced-pressure heating treatment) to thereby obtain a glass laminate. In addition, the thus obtained glass laminate is transparent and has no residual air bubbles at the bonding interface between the interlayer film and each glass sheet. Therefore, the interlayer film for glass laminate according to the present invention eliminates the necessity to perform treatment under high-temperature and high-pressure conditions to pressure-bond the interlayer film and the glass sheets together, which further eliminates the necessity to use large and expensive equipment and therefore reduces production cost.

In a case where the unsaturated fatty acid alkyl ester is a ricinoleic acid alkyl ester, it is possible to bond the interlayer film and the glass sheets together under milder conditions to obtain a glass laminate. In addition, the thus obtained glass laminate has higher transparency.

In a case where the unsaturated fatty acid alkyl ester is an oleic acid alkyl ester, it is possible to bond the interlayer film and the glass sheets together under milder conditions to obtain a glass laminate. In addition, the thus obtained glass laminate has higher transparency.

In a case where 60 to 96 wt % of the plasticizer is composed of a diester compound represented by the above formula (1), bleeding of the unsaturated fatty acid alkyl ester is less likely to occur. In addition, it is possible to bond the interlayer film and the glass sheets together under milder conditions to obtain a glass laminate. In addition, the thus obtained glass laminate has higher transparency.

Further, as described above, the glass laminate according to the present invention includes at least two transparent glass sheets and the interlayer film for glass laminate according to the present invention sandwiched between and bonded to the glass sheets, and therefore the interlayer film and the glass sheets are firmly bonded together, and the glass laminate has high transparency.

BEST MODE FOR CARRYING OUT THE INVENTION

Hereinbelow, the present invention will be described in detail.

An interlayer film for glass laminate according to the present invention contains a polyvinyl acetal resin and a plasticizer.

The polyvinyl acetal resin can be obtained by acetalization of a polyvinyl alcohol (PVA) resin with an aldehyde.

A method for producing the polyvinyl acetal resin is not particularly limited. For example, the polyvinyl acetal resin can be produced in the following manner. A polyvinyl alcohol resin is dissolved in hot water to obtain an aqueous solution of the polyvinyl alcohol resin. Then, an aldehyde and an acid catalyst are added to the aqueous solution maintained at a predetermined temperature in the range of about 0 to 95° C., and the aqueous solution is stirred to allow acetalization reaction to proceed. Then, the reaction temperature is increased for aging and the reaction is terminated. Thereafter, the thus obtained reaction mixture is subjected to various processes of neutralization, washing with water, and drying to obtain a powdery polyvinyl acetal resin.

The polyvinyl alcohol resin to be used for producing the polyvinyl acetal resin is not particularly limited, but preferably has an average polymerization degree of 500 to 5000, more preferably 1000 to 3000. If the average polymerization degree of the polyvinyl alcohol resin is less than 500, there is a case where an obtained interlayer film is too low in strength to impart excellent penetration resistance and impact-energy absorption capability to a glass laminate. On the other hand, if the average polymerization degree of the polyvinyl alcohol resin exceeds 5000, there is a case where it is difficult to produce an interlayer film and, in addition, an obtained interlayer film is too high in strength to impart excellent penetration resistance and impact-energy absorption capability to a glass laminate.

It is to be noted that the average polymerization degree of the polyvinyl alcohol resin can be measured in accordance with, for example, JIS K 6726 "Testing Method for Polyvinyl Alcohol".

The aldehyde to be used for producing the polyvinyl acetal resin is not particularly limited, and examples thereof include aldehydes having 1 to 10 carbon atoms. Specific examples of such an aldehyde include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. These aldehydes may be used singly or in combination of two or more of them. Among them, n-butyraldehyde, n-hexylaldehyde, and n-valeraldehyde are preferably used, and butyraldehyde having 4 carbon atoms is more preferably used.

Examples of the polyvinyl acetal resin include, but are not limited to, a polyvinyl formal resin obtained by reaction between a polyvinyl alcohol resin and formaldehyde, a narrowly-defined polyvinyl acetal resin obtained by reaction between a polyvinyl alcohol resin and acetaldehyde, and a polyvinyl butyral resin obtained by reaction between a polyvinyl alcohol resin and n-butyraldehyde. These polyvinyl acetal resins may be used singly or in combination of two or more of them.

As the polyvinyl acetal resin, a polyvinyl butyral resin (PVB) is preferably used. By using a polyvinyl butyral resin, it is possible to further improve the transparency, weatherability, and adhesion to glass of the interlayer film.

The acetalization degree of the polyvinyl acetal resin is preferably in the range of 60 to 85 mol %, more preferably in the range of 63 to 70 mol %. If the acetalization degree of the polyvinyl acetal resin is less than 60 mol %, there is a case where compatibility between the plasticizer and the polyvinyl acetal resin is poor and, in addition, the glass transition temperature of an obtained interlayer film is not sufficiently lowered, and therefore a glass laminate using such an interlayer film cannot exhibit sufficient sound insulation performance in a low temperature range. On the other hand, if the acetalization degree of the polyvinyl acetal resin exceeds 85 mol %, there is a case where a reaction time required for producing a polyvinyl acetal resin is increased and therefore production efficiency is reduced.

The acetyl group content of the polyvinyl acetal resin is preferably in the range of 0.5 to 30 mol %, more preferably in the range of 0.5 to 25 mol %, even more preferably in the range of 0.5 to 20 mol %.

If the acetyl group content of the polyvinyl acetal resin is less than 0.5 mol %, there is a case where compatibility between the plasticizer (which will be described later) and the polyvinyl acetal resin is poor and, in addition, the glass transition temperature of the polyvinyl acetal resin is not sufficiently lowered, and therefore a glass laminate using an obtained interlayer film containing such a polyvinyl acetal resin cannot have sufficiently improved sound insulation in a low temperature range. On the other hand, when an attempt is made to produce a polyvinyl acetal resin whose acetyl group content exceeds 30 mol %, there is a case where reactivity between, for example, a polyvinyl alcohol resin and an aldehyde is significantly lowered.

The polyvinyl acetal resin preferably has a sum total of the acetalization degree and the acetyl group content of 65 mol % or more, more preferably 68 mol % or more. If the sum total of the acetalization degree and the acetyl group content is less than 65 mol %, there is a case where compatibility between the polyvinyl acetal resin and the plasticizer (which will be described later) is poor and, in addition, the glass transition temperature of the polyvinyl acetal resin is not sufficiently lowered, and therefore a glass laminate using an obtained interlayer film containing such a polyvinyl acetal resin cannot have sufficiently improved sound insulation in a low temperature range.

It is to be noted that the acetalization degree of the polyvinyl acetal resin can be determined by measuring the acetyl group content and the vinyl alcohol content of the polyvinyl acetal resin in accordance with JIS K 6728 "Testing Method for Polyvinyl Butyral" or nuclear magnetic resonance, calculating the mol percentages by weight of both the components from the measurement values, and subtracting the sum of both the mole percentages from 100 mol % by weight.

It is to be noted that in a case where the polyvinyl acetal resin is a polyvinyl butyral resin, the acetalization (butyralization) degree and acetyl group content thereof can be calculated from the measurement values of the polyvinyl butyral resin measured in accordance with JIS K 6728 "Testing Method for Polyvinyl Butyral", infrared absorption (IR) spectrometry, or nuclear magnetic resonance (NMR).

The interlayer film for glass laminate according to the present invention contains 40 to 75 parts by weight of the plasticizer per 100 parts by weight of the polyvinyl acetal resin.

Further, 4 to 40 wt %, preferably 6 to 37 wt % of the plasticizer is composed of an unsaturated fatty acid alkyl ester having 16 to 20 carbon atoms. That is, the plasticizer contained in the interlayer film for glass laminate according to the present invention is a combination of an unsaturated fatty acid alkyl ester having 16 to 20 carbon atoms and one or more other plasticizers.

If the amount of the plasticizer is less than 40 parts by weight per 100 parts by weight of the polyvinyl acetal resin, it is necessary to subject an obtained interlayer film and glass sheets to pressure-bonding under high-temperature and high-pressure conditions to firmly bond them together to produce a glass laminate. On the other hand, if the amount of the plasticizer exceeds 70 parts by weight, bleeding is likely to occur. If the amount of the unsaturated fatty acid alkyl ester having 16 to 20 carbon atoms is less than 4 wt % of the plasticizer, it is necessary to subject an obtained interlayer film and glass sheets to pressure-bonding under high-temperature and high-pressure conditions to firmly bond them together to produce a glass laminate.

Examples of the unsaturated fatty acid alkyl ester having 16 to 20 carbon atoms include ricinoleic acid alkyl esters such as methyl ricinoleate, ethyl ricinoleate, and butyl ricinoleate; ricinolein acid alkyl esters; and oleic acid alkyl esters. Among them, ricinoleic acid alkyl esters and oleic acid alkyl esters are preferably used, and ricinoleic acid alkyl esters are more preferably used. In a case where the interlayer film according to the present invention contains a ricinoleic acid alkyl ester or an oleic acid alkyl ester in the ratio described above, it is possible to bond the interlayer film and glass sheets together under milder conditions to obtain a glass laminate. In addition, the thus obtained glass laminate has higher transparency.

As one of the one or more other plasticizers, a diester compound represented by the above formula (1) is preferably contained in the plasticizer used in the present invention. It is more preferred that 60 to 96 wt %, preferably 63 to 94 wt % of the plasticizer used in the present invention is composed of a diester compound represented by the above formula (1). When the interlayer film for glass laminate according to the present invention contains the diester compound represented by the above formula (1), bleeding of the unsaturated fatty acid alkyl ester having 16 to 20 carbon atoms is less likely to occur. In addition, it is possible to bond the interlayer film and glass sheets together under milder conditions to obtain a glass laminate. In addition, the thus obtained glass laminate has higher transparency.

It is to be noted that in the above formula (1), $R_1$ and $R_2$ are each an organic group having 5 to 10 carbon atoms, $R_3$ is a group —$CH_2$—$CH_2$—, —$CH_2$—$CH(CH_3)$—, or —$CH_2$—$CH_2$—$CH_2$—, and n is an integer of 4 to 10.

Examples of the diester compound represented by the above formula (1) to be used as a plasticizer include, but are not limited to, tetraethylene glycol di-2-ethylhexanoate, pentaethylene glycol di-2-ethylhexanoate, octaethylene glycol di-2-ethylhexanoate, nonaethylene glycol di-2-ethylhexanoate, decaethylene glycol di-2-ethylhexanoate, tetraethylene glycol di-n-heptanoate, and tetraethylene glycol di-n-octanoate.

The one or more other plasticizers (X) other than the above-mentioned plasticizer are not particularly limited, and examples thereof include known plasticizers generally used as plasticizers for polyvinyl acetal resins. Preferred examples of such plasticizers (X) include, but are not limited to, organic plasticizers such as monobasic organic acid esters and polybasic organic acid esters; and phosphoric acid-based plasticizers such as organic phosphoric acid-based plasticizers and organic phosphorous acid-based plasticizers. These plasticizers (X) may be used singly or in combination of two or more of them. The plasticizer (X) to be used is appropriately selected depending on the kind of polyvinyl acetal resin used in consideration of, for example, compatibility with the polyvinyl acetal resin.

Examples of the monobasic organic acid esters include, but are not limited to, glycol-based esters obtained by reaction between glycols such as triethylene glycol and tripropylene glycol and monobasic organic acids such as butyric acid, isobutyric acid, caproic acid, 2-ethylbutyric acid, heptanoic acid, heptylic acid, n-octylic acid, 2-ethylhexylic acid, pelargonic acid (n-nonylic acid), and decylic acid. Among them, triethylene glycol monobasic organic acid esters, such as triethylene glycol dicaproic acid ester, triethylene glycol di-2-ethylbutyric acid ester, triethylene glycol di-n-octylic acid ester, and triethylene glycol di-2-ethylhexylic acid ester are preferably used.

Examples of the polybasic organic acid esters include, but are not limited to, esters obtained by reaction between polybasic organic acids such as adipic acid, sebacic acid, and azelaic acid and straight or branched alcohols having 4 to 8 carbon atoms. Among them, dibutyl sebacic acid ester, dioctyl azelaic acid ester, and dibutylcarbitol adipic acid ester are preferably used.

Examples of the organic phosphoric acid-based plasticizers include, but are not limited to, triethylene glycol diethylbutyrate, triethylene glycol diethylhexoate, triethylene glycol dibutylsebacate, tributoxyethyl phosphate, isodecylphenyl phosphate, and triisopropyl phosphate. Among them, triethylene glycol diethylbutyrate, triethylene glycol diethylhexoate, and triethylene glycol dibutylsebacate are preferably used.

As described above, the interlayer film for glass laminate according to the present invention contains, as essential components, the polyvinyl acetal resin and the plasticizer, but if necessary, may further contain one or more additives such as tackifiers, coupling agents, surfactants, antioxidants, heat stabilizers, light stabilizers, UV absorbers, colorants, dehydration agents, antifoaming agents, antistatic agents, and flame retardants, as long as the additive or additives do not hinder the achievement of the object of the present invention.

The interlayer film for glass laminate according to the present invention can be obtained by forming a film of a polyvinyl acetal resin composition, containing the polyvinyl acetal resin and the plasticizer as essential components and, if necessary, one or more additives, in the usual manner.

The interlayer film for glass laminate preferably has a melt viscosity at 110° C. of 10000 Pa·s or more and a melt viscosity at 140° C. of 100000 Pa·s or less. By setting the melt viscosity at 110° C. and 140° C. of the interlayer film to 10000 Pa·s or more and 100000 Pa·s or less, respectively, it is possible for the interlayer film to exhibit higher adhesion performance.

If the melt viscosity at 110° C. of the interlayer film for glass laminate is less than 10000 Pa·s, there is a case where the handleability of the interlayer film is poor and therefore misalignment between glass sheets or foaming occurs during the production of a glass laminate. In addition, there is also a case where the interlayer film is too low in strength to impart excellent penetration resistance to a glass laminate. On the other hand, if the melt viscosity at 140° C. of the interlayer film for glass laminate exceeds 100000 Pa·s, there is a case where it is difficult to perform molding (film formation) stably. In addition, there is also a case where the interlayer film for glass laminate is too high in strength to impart excellent penetration resistance to a glass laminate.

The thickness of the interlayer film for glass laminate is not particularly limited, but is preferably in the range of 0.3 to 2.4 mm, more preferably in the range of 0.3 to 1.6 mm. A glass laminate having the thicker interlayer film exhibits higher sound insulation performance. However, if the interlayer film is too thick, there is a case where a glass laminate using such an interlayer film is poor in penetration resistance and becomes thicker than its desired thickness. For this reason, the interlayer film for glass laminate preferably has a thickness within the above range.

A glass laminate according to the present invention can be produced by interposing the interlayer film for glass laminate according to the present invention between at least two transparent glass sheets and then integrating them into one unit.

Examples of the transparent glass sheet include not only inorganic transparent glass sheets usually used but also organic transparent glass sheets such as polycarbonate sheets and polymethyl methacrylate sheets.

Examples of types of such various inorganic and organic glass sheets include, but are not limited to, float plate glass, polished plate glass, flat plate glass, curved plate glass, common plate glass, figured glass, wired figured glass, and colored plate glass. These various types of glass may be used singly or in combination of two or more of them. The thickness of the glass sheet of the glass laminate according to the present invention is not particularly limited, and is appropriately selected depending on the purpose of use of the glass laminate.

The glass laminate is usually produced in the following manner.

For example, the interlayer film for glass laminate according to the present invention is sandwiched between two transparent glass sheets to obtain a sandwiched structure, and then the sandwiched structure is put into a rubber bag and air in the rubber bag is removed by suction under a reduced pressure at a temperature of about 70 to 110° C. to preliminarily bond the glass sheets and the interlayer film together. Then, the sandwiched structure is subjected to autoclave treatment using an autoclave under conditions of a temperature of about 140 to 150° C. and a pressure of about 0.98 to 1.47 MPa for, for example, 20 minutes to apply heat and pressure thereto to finally bond the glass sheets and the interlayer film together to obtain a glass laminate.

However, as described above, the interlayer film for glass laminate according to the present invention contains the above-described specific plasticizer in the above-described specific ratio, and therefore in a case where a glass laminate is produced using the interlayer film according to the present invention, it is not always necessary to perform the above-described autoclave treatment conventionally needed to produce a glass laminate. That is, it is possible to bond the interlayer film for glass laminate according to the present invention and glass sheets together by non-autoclave treatment to obtain a glass laminate. In addition, the thus obtained glass laminate is transparent and has no residual air bubbles at the bonding interface between the interlayer film and each glass sheet. As a matter of course, a glass laminate using the interlayer film for glass laminate according to the present invention may be produced by the above-described autoclave treatment.

The autoclave treatment is performed under severe conditions of high temperature and high pressure to pressure-bond a conventional interlayer film and glass sheets together, and therefore needs large and expensive equipment, which inevitably increases production cost. On the other hand, the interlayer film for glass laminate according to the present invention does not need to be pressure-bonded to glass sheets under high-temperature and high-pressure conditions.

A glass laminate using the interlayer film for glass laminate according to the present invention can be produced in the following manner. For example, the interlayer film for glass laminate according to the present invention is sandwiched between two glass sheets to obtain a sandwiched structure, and then the sandwiched structure is put into a rubber bag, and air in the rubber bag is removed by suction under a reduced pressure of about 0.016 to 0.020 MPa at a temperature of about 70 to 110° C. to preliminarily bond the glass sheets and the interlayer film together. Then, the sandwiched structure is left stand under a reduced pressure of about 0.016 to 0.020 MPa at a temperature of 120 to 140° C. for 15 to 60 minutes to thereby obtain a glass laminate. As described above, the interlayer film for glass laminate according to the present invention does not need to be pressure-bonded to the glass sheets under high-temperature and high-pressure conditions, which eliminates the necessity to use large and expensive equipment and therefore reduces production cost.

Hereinbelow, the present invention will become more apparent from a detailed description of the following examples and comparative examples. It is to be noted that the present invention is not limited to the following examples.

(Synthesis of Polyvinyl Butyral Resin A)

2700 mL of ion-exchanged water and 250 g of a polyvinyl alcohol resin having an average polymerization degree of 2400 and a saponification degree of 87 mol % were fed into a reaction vessel equipped with a stirring device, and then they were heated and stirred to dissolve the polyvinyl alcohol resin in the ion-exchanged water. To the thus obtained solution, 0.2 wt % of a 35 wt % aqueous hydrochloric acid solution was added as a catalyst, and then the solution was adjusted to 20° C. Then, 10 g of n-butyraldehyde was added as an aldehyde to the solution stirred. Then, 115 g of n-butyraldehyde was added thereto to precipitate white fine particles of a polyvinyl butyral resin. After a lapse of 10 minutes from precipitation, 1.8 wt % of a 35 wt % aqueous hydrochloric acid solution was added to the reaction mixture, and the reaction mixture was heated to 60° C. at a temperature rise rate of 20° C./hr and was then cooled. Thereafter, the reaction mixture was neutralized and washed with water, and then the reaction product was dried to obtain a polyvinyl butyral resin A having a butyralization (acetalization) degree of 65.1 mol %, an acetyl group content of 12.3 mol %, and an average polymerization degree of 3200.

(Synthesis of Polyvinyl Butyral Resin B)

275 g of polyvinyl alcohol having an average polymerization degree of 1700 and a saponification degree of 98.9 mol % was added to and dissolved in 2890 g of ion-exchanged water by heating, and then the thus obtained solution was adjusted to 12° C. Then, 201 g of 35 wt % hydrochloric acid and 148 g of n-butyraldehyde were added to the solution, and the temperature of the solution was maintained at 12° C. to precipitate a reaction product. Then, the reaction mixture was maintained at 45° C. for 3 hours to terminate reaction. The reaction product was washed with excess water, neutralized with an aqueous sodium hydroxide solution, washed with excess water for 2 hours, and dried to obtain a polyvinyl butyral resin as a white powder. The thus obtained polyvinyl butyral resin had an average polymerization degree of 1700, a butyralization degree of 65 mol %, and a residual acetyl group content of 1 mol %.

(Unsaturated Fatty Acid Alkyl Ester with 16 to 20 Carbon Atoms)
 Methyl Ricinoleate
(Diester Compound)
 Tetraethylene glycol-di-2-ethylhexanoate Example 1

To 100 parts by weight of the polyvinyl butyral resin A, 10 parts by weight of methyl ricinoleate and 40 parts by weight of tetraethylene glycol-di-2-ethylhexanoate were added as plasticizers, and then they were melt-kneaded uniformly with a mixing roll, and press-molded with a press molding machine at 150° C. for 30 minutes, and passed between embossing rolls to produce a 0.7 mm-thick interlayer film for glass laminate having an embossed pattern of engraved lines (hereinafter, referred to as "embossed lines") on its both surfaces.

Examples 2 to 6 and Comparative Examples 1 to 5

An interlayer film for glass laminate was produced in the same manner as in the Example 1 except that the mixing ratio between the plasticizers was changed to that shown in Table 1.

Examples 7 to 13 and Comparative Examples 6 to 11

An interlayer film for glass laminate was produced in the same manner as in the Example 1 except that the polyvinyl butyral resin A was changed to the polyvinyl butyral resin B (100 parts by weight) and that methyl ricinoleate and tetraethylene glycol-di-2-ethylhexanoate (4GO) as plasticizers were mixed in a ratio shown in Table 2.

It is to be noted that an attempt was made to produce an interlayer film for glass laminate according to Comparative Example 2 in the same manner as in the Example 1 except that the mixing ratio between the plasticizers was changed to that shown in Table 1, but an interlayer film for glass laminate could not be produced because extrusion was impossible.

(Evaluation)

(1) Surface Tackiness

The presence or absence of surface tackiness in each of the interlayer films for glass laminate of the Examples 1 to 13 and the Comparative Examples 1 to11 was evaluated by touching a hand to the surface thereof. Evaluation results are shown in the following Tables 1 and 2.

It is to be noted that if the interlayer film for glass laminate has surface tackiness, blocking is likely to occur when the interlayer film is wound into a roll. Therefore, the interlayer film for glass laminate preferably has no surface tackiness to have high blocking resistance.

In the interlayer film for glass laminate according to the Comparative Example 3, bleeding of the plasticizers to its surface was so significant that the presence or absence of surface tackiness could not be evaluated.

(2) Presence or Absence of Residual Air Bubbles and Presence or Absence of Traces of Embossed Lines Each of the interlayer films for glass laminate of the Examples 1 to 13 and the Comparative Examples 1 to 11 was sandwiched between two transparent curved glass sheets (length: 30 cm, width: 30 cm) to obtain a sandwiched structure. The sandwiched structure was put into a rubber bag, and air was removed by suction from the rubber bag under a reduced pressure of about 0.016 to 0.020 MPa at a temperature of about 90° C. to preliminarily bond the interlayer film and the glass sheets together. Then, the sandwiched structure was left stand under a reduced pressure of 0.016 to 0.020 MPa at a temperature of 100° C. for 20 minutes to produce a glass laminate. It is to be noted that three glass laminates were prepared using each of the interlayer films for glass laminate of the Examples 1 to 13 and the Comparative Examples 1 to 11.

The presence or absence of residual air bubbles at the bonding interface between the interlayer film and each glass sheet and the presence or absence of traces of the embossed lines in these three glass laminates were evaluated in accordance with the following criteria.

(Criteria for Evaluation of Presence or Absence of Residual Air Bubbles and Presence or Absence of Traces of Embossed Lines)

⊙: When being observed with a 20× loupe, all the three glass laminates were transparent and had no residual air bubbles.

⊙: When being observed with a 20× loupe, all the three glass laminates were transparent and had no traces of the embossed lines.

○: When being observed with the naked eye, all the three glass laminates were transparent and had no residual air bubbles.

○: When being observed with the naked eye, all the three glass laminates were transparent and had no traces of the embossed lines.

Δ: When being observed with the naked eye, any one of the three glass laminates had a very little amount of residual air bubbles.

Δ: When being observed with the naked eye, any one of the three glass laminates had faint traces of the embossed lines.

x: When being observed with the naked eye, one or more of the three glass laminates clearly had residual air bubbles.

x: When being observed with the naked eye, any one of the three glass laminates had clear traces of the embossed lines.

Evaluation results are shown in the following Tables 1 and 2.

TABLE 1

|  |  |  | Examples |  |  |  |  |  | Comparative Examples |  |  |  |  |
|---|---|---|---|---|---|---|---|---|---|---|---|---|---|
|  |  |  | 1 | 2 | 3 | 4 | 5 | 6 | 1 | 2 | 3 | 4 | 5 |
| Mixing Ratio | Polyvinyl Butyral Resin | Parts by Weight | 100 | 100 | 100 | 100 | 100 | 100 | 100 | 100 | 100 | 100 | 100 |
|  | Methyl Ricinoleate | Parts by Weight | 10 | 10 | 10 | 10 | 8 | 18 | — | 20 | 10 | 1 | 20 |
|  | Tetraethylene Glycol-di-2-ethylhexanoate | Parts by Weight | 40 | 50 | 55 | 65 | 55 | 55 | 55 | — | 80 | 35 | 15 |
| Evaluation | Presence or Absence of Residual Air Bubbles |  | ○ | ○ | ○ | ○ | ○ | ○ | X | — | Δ | ○ | ○ |
|  | Presence or Absence of Traces of Embossed Lines |  | ○ | ○ | ○ | ○ | ○ | ○ | X | — | ○ | Δ | Δ |
|  | Presence or Absence of Surface Tackiness |  | Absent | Absent | Absent | Absent | Absent | Absent | Absent | — | — | Absent | Present |
|  | Remarks |  | — | — | — | — | — | — | — | Extrusion was impossible. | Bleeding of plasticizers occurred. | — | — |

TABLE 2

|  |  |  | Examples |  |  |  |  |  |  | Comparative Examples |  |  |  |  |  |
|---|---|---|---|---|---|---|---|---|---|---|---|---|---|---|---|
|  |  |  | 7 | 8 | 9 | 10 | 11 | 12 | 13 | 6 | 7 | 8 | 9 | 10 | 11 |
| Mixing Ratio | Polyvinyl Butyral Resin | Parts by Weight | 100 | 100 | 100 | 100 | 100 | 100 | 100 | 100 | 100 | 100 | 100 | 100 | 100 |
|  | Methyl Ricinoleate | Parts by Weight | 10 | 15 | 10 | 10 | 10 | 5 | 8 | — | 10 | 1 | 35 | 40 | 25 |
|  | 4GO* | Parts by Weight | 40 | 50 | 55 | 65 | 35 | 40 | 55 | 55 | 80 | 35 | 15 | — | 40 |
| Evaluation | Presence or Absence of Residual Air Bubbles |  | ⊙ | ⊙ | ⊙ | ○ | ○ | ○ | ⊙ | X | Δ | ○ | ○ | X | ○ |
|  | Presence or Absence of Traces of Embossed Lines |  | ⊙ | ⊙ | ⊙ | ○ | ○ | ○ | ○ | X | ○ | Δ | Δ | X | Δ |
|  | Presence or Absence of Surface Tackiness |  | Absent | Absent | Absent | Absent | Absent | Absent | Absent | Absent | — | Absent | Present | Present | Present |
|  | Remarks |  | — | — | — | — | — | — | — | — | Bleeding of plasticizers occurred. | — | — | — | — |

*4GO: tetraethylene glycol di-2-ethylhexanoate

What is claimed is:

1. An interlayer film for glass laminate, comprising:
100 parts by weight of a polyvinyl acetal resin; and
40 to 75 parts by weight of a plasticizer, wherein 4 to 40 wt % of the plasticizer is composed of an unsaturated fatty acid alkyl ester having 16 to 20 carbon atoms, and wherein the remainder of the plasticizer is composed of one or more other plasticizers.

2. The interlayer film for glass laminate according to claim 1, wherein the unsaturated fatty acid alkyl ester is a ricinoleic acid alkyl ester.

3. The interlayer film for glass laminate according to claim 1, wherein the unsaturated fatty acid alkyl ester is an oleic acid alkyl ester.

4. The interlayer film for glass laminate according to any one of claims 1 to 3, wherein 60 to 96 wt % of the plasticizer is composed of a diester compound represented by the following formula (1)

[Chem. 1]

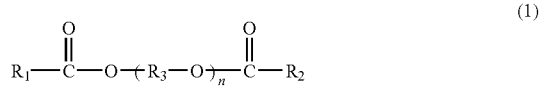
(1)

where $R_1$ and $R_2$ are each an organic group having 5 to 10 carbon atoms, $R_3$ is a group $-C_2-CH_2-$, $-CH_2-CH(CH_3)-$, or $-CH_2-CH_2-CH_2-$, and n is an integer of 4 to 10.

5. A glass laminate comprising:
at least two transparent glass sheets; and
the interlayer film for glass laminate according to any one of claims 1 to 3 sandwiched between and bonded to the glass sheets.

* * * * *